(12) United States Patent
Taniyama et al.

(10) Patent No.: US 11,525,046 B2
(45) Date of Patent: Dec. 13, 2022

(54) FOAM

(71) Applicant: ZEON CORPORATION, Tokyo (JP)

(72) Inventors: Tomoya Taniyama, Tokyo (JP); Takashi Iga, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 183 days.

(21) Appl. No.: 16/769,660

(22) PCT Filed: Dec. 10, 2018

(86) PCT No.: PCT/JP2018/045312
§ 371 (c)(1),
(2) Date: Jun. 4, 2020

(87) PCT Pub. No.: WO2019/117084
PCT Pub. Date: Jun. 20, 2019

(65) Prior Publication Data
US 2021/0179801 A1 Jun. 17, 2021

(30) Foreign Application Priority Data

Dec. 13, 2017 (JP) .............................. JP2017-238732

(51) Int. Cl.
*C08J 9/30* (2006.01)

(52) U.S. Cl.
CPC ............. *C08J 9/30* (2013.01); *C08J 2309/00* (2013.01); *C08J 2375/04* (2013.01); *C08J 2409/00* (2013.01); *C08J 2475/04* (2013.01)

(58) Field of Classification Search
CPC ... C08G 2110/0008; C08J 9/0061; C08J 9/30; C08J 2201/026; C08J 2205/04; C08J 2309/00; C08J 2309/02; C08J 2375/04; C08J 2409/00; C08J 2475/04; C08L 9/02; C08L 9/04; C08L 75/04
See application file for complete search history.

(56) References Cited

U.S. PATENT DOCUMENTS 9,505,881 B1 * 11/2016 Adkins ............... C08F 290/067

FOREIGN PATENT DOCUMENTS

| JP | H02-035964 A | 2/1990 |
| JP | H08-5988 B2 | 1/1996 |
| JP | H11-206448 A | 8/1999 |
| JP | H11-209455 A | 8/1999 |

OTHER PUBLICATIONS

Feb. 19, 2019 International Search Report issued in International Patent Application No. PCT/JP2018/045312.
Jul. 13, 2021 Search Report issued in European Patent Application No. 18887947.2.
Jun. 16, 2020 International Preliminary Reporton Patentability issued in International Patent Application No. PCT/JP2018/045312.

* cited by examiner

*Primary Examiner* — John M Cooney
(74) *Attorney, Agent, or Firm* — Oliff PLC

(57) ABSTRACT

A foam containing a nitrile group-containing conjugated diene copolymer and a urethane polymer, wherein relative to 100 wt % of the sum of the nitrile group-containing conjugated diene copolymer and the urethane polymer, the nitrile group-containing conjugated diene copolymer is present in an amount of less than 90 wt % and the urethane polymer is present in an amount of more than 10 wt %, the nitrile group-containing conjugated diene copolymer contains ethylenically unsaturated nitrile monomer units in an amount of more than 31 wt %, the foam has a density of 0.08 to 0.30 g/cm$^3$, and in observation of an arbitrary cross section of the foam, air bubble cross sections present in the cross section have an average diameter of 350 μm or less, and the number of air bubble cross sections with a diameter of 0.6 mm or more present in the cross section is 0.062 per mm$^2$ or less.

6 Claims, 3 Drawing Sheets

FOAM

TECHNICAL FIELD

The present invention relates to a foam, and more specifically relates to a foam which has excellent flexibility and an excellent ability to be impregnated with a cosmetic, enables the cosmetic to be applied evenly onto the skin, and is unlikely to deform and wear out even when it is impregnated with the cosmetic.

BACKGROUND ART

Rubber foams (foam rubbers) produced using polymer lattices have been used in a variety of applications such as mattresses, puffs (cosmetic sponges), rolls, and shock absorbers. Among these applications of rubber foams, in particular, rubber foams used as puffs should have a favorable foaming state, have a uniform foamed structure, and have a good balance between resilience and a feel.

For example, Patent Document 1 discloses a method of producing a cosmetic puff substrate having high physical properties, the method comprising aerating and stirring a composition containing a water-soluble nitrile-butadiene rubber (NBR) emulsion, a water-soluble urethane emulsion, a cross-linking agent, a surfactant, and a gelling agent to cause the composition to foam; and then heating and vulcanizing the composition to provide a puff substrate having a predetermined shape. In this method, the water-soluble NBR emulsion has a solids content of 60 wt % or more, and the water-soluble urethane emulsion is present in an amount (in terms of solids content) of 5 to 15 wt % of the total solids content of both the emulsions. Unfortunately, the cosmetic puff substrate having high physical properties produced by the technique of Patent Document 1 tends to deform when it is impregnated with a cosmetic. Another problem is that the puff substrate impregnated with the cosmetic will significantly wear out when it is used continuously.

RELATED ART DOCUMENTS

Patent Documents

Patent Document 1: Japanese Examined Patent Publication No. H08-5988

SUMMARY OF THE INVENTION

Problem to be Solved by the Invention

The present invention has been made in consideration of the current circumstances, and the purpose of the present invention is to provide a foam which has excellent flexibility and an excellent ability to be impregnated with a cosmetic, enables the cosmetic to be applied evenly onto the skin, and is unlikely to deform and wear out even when it is impregnated with the cosmetic.

Means for Solving Problems

As a result of intensive studies to achieve the above purpose, the present inventors have found that the purpose can be achieved by using a nitrile group-containing conjugated diene copolymer having a specific monomer composition, adjusting the amounts of nitrile group-containing conjugated diene copolymer and urethane polymer, and controlling the density of a foam and the size of air bubbles in the foam. This finding has led to the completion of the present invention.

Specifically, the present invention provides a foam containing a nitrile group-containing conjugated diene copolymer and a urethane polymer, wherein relative to 100 wt % of the sum of the nitrile group-containing conjugated diene copolymer and the urethane polymer, the nitrile group-containing conjugated diene copolymer is present in an amount of less than 90 wt % and the urethane polymer is present in an amount of more than 10 wt %, the nitrile group-containing conjugated diene copolymer contains ethylenically unsaturated nitrile monomer units in an amount of more than 31 wt %, the foam has a density of 0.08 to 0.30 $g/cm^3$, and in observation of an arbitrary cross section of the foam, air bubble cross sections present in the cross section have an average diameter of 350 µm or less, and the number of air bubble cross sections with a diameter of 0.6 mm or more present in the cross section is 0.062 per $mm^2$ or less.

In the foam according to the present invention, it is preferred that relative to 100 wt % of the sum of the nitrile group-containing conjugated diene copolymer and the urethane polymer, the nitrile group-containing conjugated diene copolymer be present in an amount of 85 wt % or less and the urethane polymer be present in an amount of 15 wt % or more.

In the foam according to the present invention, the nitrile group-containing conjugated diene copolymer preferably contains the ethylenically unsaturated nitrile monomer units in an amount of 32 to 80 wt % and conjugated diene monomer units in an amount of 20 to 68 wt %.

The foam according to the present invention preferably further contains an ultraviolet absorber.

Effects of Invention

The present invention provides a foam which has excellent flexibility and an excellent ability to be impregnated with a cosmetic, enables the cosmetic to be applied evenly onto the skin, and is unlikely to deform and wear out even when it is impregnated with the cosmetic.

DESCRIPTION OF EMBODIMENTS

Figure 1:
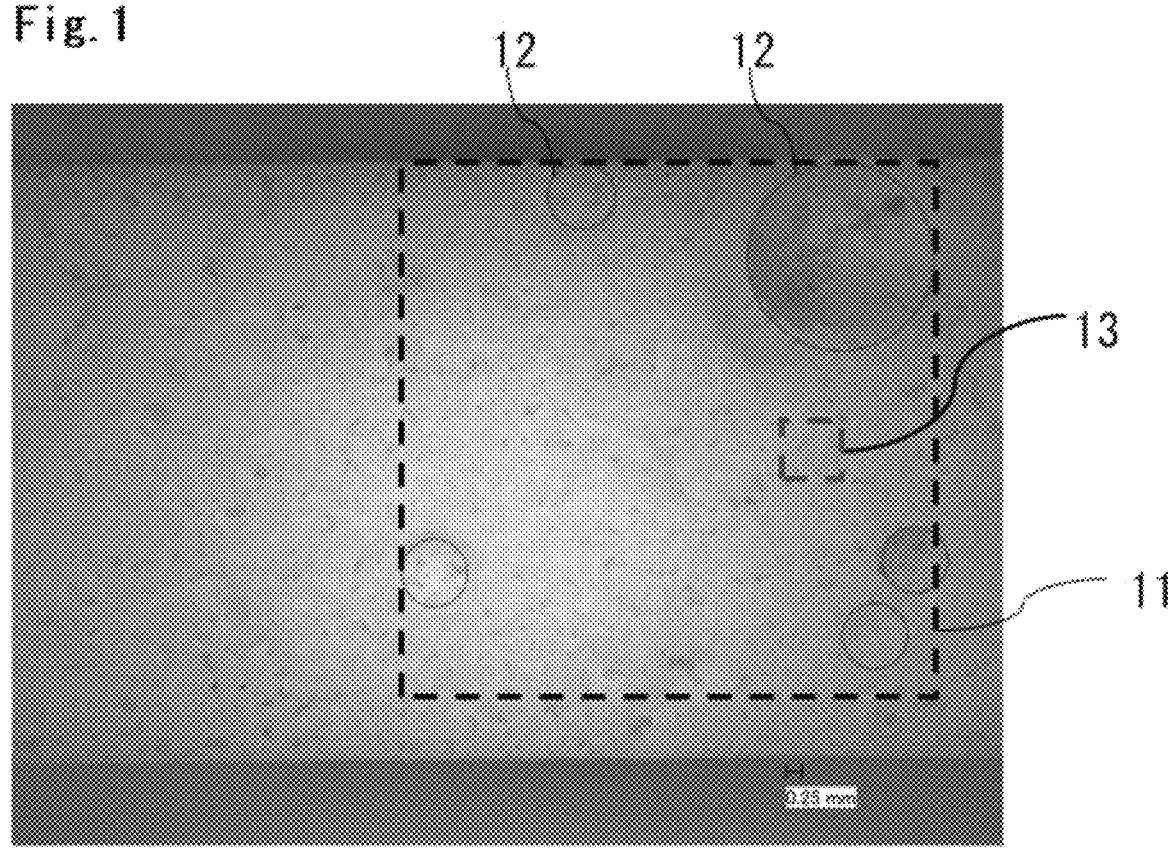
FIG. 1 is an exemplary microscopic photograph (magnification=30×) of an arbitrary cross section of a foam.

The foam according to the present invention contains a nitrile group-containing conjugated diene copolymer and a urethane polymer. In the foam, relative to 100 wt % of the sum of the nitrile group-containing conjugated diene copolymer and the urethane polymer, the nitrile group-containing conjugated diene copolymer is present in an amount of less than 90 wt % and the urethane polymer is present in an amount of more than 10 wt %, the nitrile group-containing conjugated diene copolymer contains ethylenically unsaturated nitrile monomer units in an amount of more than 31 wt %, the foam has a density of 0.08 to 0.30 g/cm$^3$, and in observation of an arbitrary cross section of the foam, air bubble cross sections present in the cross section have an average diameter of 350 μm or less, and the number of air bubble cross sections with a diameter of 0.6 mm or more present in the cross section is 0.062 per mm$^2$ or less.

First, the nitrile group-containing conjugated diene copolymer and the urethane polymer in the foam according to the present invention are illustrated.

Nitrile Group-Containing Conjugated Diene Copolymer

The nitrile group-containing conjugated diene copolymer is a copolymer prepared through copolymerization of a conjugated diene monomer and an ethylenically unsaturated nitrile monomer. The nitrile group-containing conjugated diene copolymer may be a copolymer prepared through copolymerization of these monomers and an optional different ethylenically unsaturated monomer copolymerizable therewith.

The ethylenically unsaturated nitrile monomer may be any ethylenically unsaturated monomer having a nitrile group. Examples thereof include, but are not limited to, acrylonitrile, methacrylonitrile, fumaronitriles, α-chloroacrylonitrile, α-cyanoethylacrylonitrile, and the like. Among these monomers, preferred are acrylonitrile and methacrylonitrile, and more preferred is acrylonitrile. These ethylenically unsaturated nitrile monomers can be used alone or in combination.

The nitrile group-containing conjugated diene copolymer contains ethylenically unsaturated nitrile monomer units famed of the ethylenically unsaturated nitrile monomer in an amount of more than 31 wt %, preferably 32 to 80 wt %, more preferably 33 to 70 wt %, further more preferably 34 to 60 wt %. Control of the amount of ethylenically unsaturated nitrile monomer units within the above ranges results in a foam which has excellent flexibility and an excellent ability to be impregnated with a cosmetic, enables the cosmetic to be applied evenly onto the skin, and is unlikely to deform and wear out even when it is impregnated with the cosmetic. An excessively small amount of ethylenically unsaturated nitrile monomer units does not result in a foam which has excellent flexibility and an excellent ability to be impregnated with a cosmetic, enables the cosmetic to be applied evenly onto the skin, and is unlikely to deform and wear out even when it is impregnated with the cosmetic. An excess amount of ethylenically unsaturated nitrile monomer units tends to result in a foam having poor cold resistance and thus a high brittleness temperature.

Examples of the conjugated diene monomer include 1,3-butadiene, isoprene, 2,3-dimethyl-1,3-butadiene, 2-ethyl-1,3-butadiene, 1,3-pentadiene, chloroprene, and the like. Among these, preferred are 1,3-butadiene and isoprene. These conjugated diene monomers can be used alone or in combination.

The nitrile group-containing conjugated diene copolymer contains conjugated diene monomer units famed of the conjugated diene monomer in an amount of preferably less than 69 wt %, more preferably 20 to 68 wt %, further more preferably 30 to 67 wt %, particularly preferably 40 to 66 wt %. Control of the amount of conjugated diene monomer units within the above ranges results in a foam which has further enhanced flexibility and a further enhanced ability to be impregnated with a cosmetic, enables the cosmetic to be applied more evenly onto the skin, and is more unlikely to deform and wear out even when it is impregnated with the cosmetic.

In order to provide a foam which has further enhanced flexibility and a further enhanced ability to be impregnated with a cosmetic, enables the cosmetic to be applied more evenly onto the skin, and is more unlikely to deform and wear out even when it is impregnated with the cosmetic, both 1,3-butadiene and isoprene are preferably used, and the ratio of 1,3-butadiene units to isoprene units in the nitrile group-containing conjugated diene copolymer is preferably controlled within the range of 5/5 to 9/1.

Examples of the different ethylenically unsaturated monomer copolymerizable with the conjugated diene monomer and the ethylenically unsaturated nitrile monomer include ethylenically unsaturated carboxylic acids such as (meth)acrylic acid, (anhydrous) maleic acid, fumaric acid, and itaconic acid; mono- or dialkyl esters of ethylenically unsaturated carboxylic acids such as methyl (meth)acrylate, ethyl (meth)acrylate, butyl (meth)acrylate, 2-ethylhexyl (meth)acrylate, lauryl (meth)acrylate, mono- or dimethyl maleate, mono- or diethyl fumarate, mono- or di-n-butyl fumarate, and mono- or di-n-butyl itaconate; alkoxy alkyl esters of ethylenically unsaturated carboxylic acids such as methoxy acrylate, ethoxy acrylate, and methoxyethoxyethyl acrylate; (meth)acrylates having hydroxyalkyl groups, such as 2-hydroxyethyl (meth)acrylate, hydroxypropyl (meth)acrylate, and hydroxybutyl (meth)acrylate; glycidyl (meth)acrylate; (meth)acrylic acid amides and derivatives thereof such as (meth)acrylamides, N-methylol(meth)acrylamide, and N-butoxymethyl(meth)acrylamide; acrylates having an amino group such as dimethylaminomethyl acrylate and diethylaminomethyl acrylate; aromatic vinyl monomers such as styrene, α-methylstyrene, vinyltoluene, and chlorostyrene; α-olefins such as ethylene and propylene; non-conjugated diene monomers such as dicyclopentadiene and vinyl norbornene; and the like. These monomers can be used alone or in combination. The nitrile group-containing conjugated diene copolymer contains different monomer units famed of the different ethylenically unsaturated monomer in an amount of preferably 40 wt % or less, more preferably 30 wt % or less, still more preferably 20 wt % or less. Control of the amount of different monomer units within the above ranges results in a foam which has further enhanced flexibility and a further enhanced ability to be impregnated with a cosmetic, enables the cosmetic to be applied more evenly onto the skin, and is more unlikely to deform and wear out even when it is impregnated with the cosmetic.

Urethane Polymer

The urethane polymer is a polymer having a urethane bond, and may be a polymer contained in a urethane polymer latex. For example, the urethane latex is, but is not limited to, a latex prepared by mixing an aqueous solution containing a neutralizer with a solution or dispersion of a hydrophilic group-containing urethane resin in an organic solvent, and optionally removing the organic solvent, the urethane resin being prepared by reacting an active hydrogen-containing compound, a hydrophilic group-containing compound, and a polyisocyanate. An alternative example thereof is a latex prepared by reacting an active hydrogen-containing compound, a hydrophilic group-containing compound, and a polyisocyanate to prepare an isocyanate group-terminated urethane prepolymer having a hydrophilic group, and mixing an aqueous solution containing a neutralizer and a polyamine with the terminal isocyanate group-containing urethane prepolymer to react the polyamine with the prepolymer.

Examples of the active hydrogen-containing compound include, but are not limited to, polyols such as polyester polyols, polyether polyols, polycarbonate polyols, polyacetal polyols, polyacrylate polyols, polyesteramide polyols, polythioether polyols, and polyols of polyolefins such as polybutadiene; polyhydroxy compounds of glycol compounds used as raw materials for polyester polyols, glycerol, trimethylolethane, trimethylolpropane, sorbitol, and pentaerythritol; amine compounds such as ethylenediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine, 1,4-cyclohexanediamine, 1,2-propanediamine, hydrazine, diethylenetriamine, and triethylenetetramine; and the like.

Examples of the hydrophilic group-containing compound include, but are not limited to, ionic compounds having one or more active hydrogen atoms in the molecule and having at least one functional group selected from the group consisting of a carboxylic acid salt group, a sulfonic acid salt group, a phosphoric acid salt group, a quaternary ammonium salt group, a carboxylic acid group, a sulfonic acid group, a phosphoric acid group, a tertiary amino group, and a betaine group; nonionic compounds having one or more active hydrogen atoms in the molecule and having a group comprising repeating units of ethylene oxide or a group comprising repeating units of ethylene oxide and repeating units of another alkylene oxide; and the like.

Examples of the isocyanate include, but are not limited to, 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3-cyclohexylene diisocyanate, 1,4-cyclohexylene diisocyanate, xylylene diisocyanate, tetramethylxylylene diisocyanate, hydrogenated xylylene diisocyanate, lysine diisocyanate, isophorone diisocyanate, 4,4'-dicyclohexylmethane diisocyanate, 3,3'-dimethyl-4,4'-dicyclohexylmethane diisocyanate, and the like.

In order to provide a foam which has further enhanced flexibility and a further enhanced ability to be impregnated with a cosmetic, enables the cosmetic to be applied more evenly onto the skin, and is more unlikely to deform and wear out even when it is impregnated with the cosmetic, the urethane polymer has a tetrahydrofuran insoluble fraction of preferably 3 wt % or more, more preferably 5 wt % or more. A higher tetrahydrofuran insoluble fraction indicates that the urethane polymer contains a larger amount of high molecular weight substances.

In order to ensure handling properties during manufacture and provide a foam which has further enhanced flexibility and a further enhanced ability to be impregnated with a cosmetic, enables the cosmetic to be applied more evenly onto the skin, and is more unlikely to deform and wear out even when it is impregnated with the cosmetic, the urethane polymer has a viscosity at 23° C. in the range of preferably 6000 Pa·s or less, more preferably 5000 Pa·s or less, the viscosity being measured in a latex having a solids content of 50 wt %.

Foam

In the foam according to the present invention, relative to 100 wt % of the sum of the nitrile group-containing conjugated diene copolymer and the urethane polymer, the nitrile group-containing conjugated diene copolymer is present in an amount of less than 90 wt % and the urethane polymer is present in an amount of more than 10 wt %. It is preferred that the amount of nitrile group-containing conjugated diene copolymer be 85 wt % or less and the amount of urethane polymer be 15 wt % or more. It is more preferred that the amount of nitrile group-containing conjugated diene copolymer be 50 to 85 wt % and the amount of urethane polymer be 15 to 50 wt %. Control of the amounts of nitrile group-containing conjugated diene copolymer and urethane polymer within the above ranges results in a foam which has excellent flexibility and an excellent ability to be impregnated with a cosmetic, enables the cosmetic to be applied evenly onto the skin, and is unlikely to deform and wear out even when it is impregnated with the cosmetic. An excess amount of nitrile group-containing conjugated diene copolymer may result in a foam which deforms and wears out when it is impregnated with a cosmetic. An excess amount of urethane polymer may result in a foam having poor flexibility and a poor ability to be impregnated with a cosmetic, and such a foam may make it difficult to apply the cosmetic evenly onto the skin.

The foam according to the present invention has a density of 0.08 to 0.30 g/cm$^3$, preferably 0.10 to 0.28 g/cm$^3$, further more preferably 0.12 to 0.25 g/cm$^3$. Control of the density of the foam within the above ranges results in a foam which has excellent flexibility and an excellent ability to be impregnated with a cosmetic, enables the cosmetic to be applied evenly onto the skin, and is unlikely to deform and wear out even when it is impregnated with the cosmetic. A foam having too low a density wears out when it is impregnated with a cosmetic. A foam having too high a density may have poor flexibility and a poor ability to be impregnated with a cosmetic.

The average diameter of air bubble cross sections present in a cross section of the foam according to the present invention is 350 μm or less, preferably 100 to 300 μm, more preferably 130 to 270 μm. Control of the average diameter of the air bubble cross sections within the above ranges results in a foam which has excellent flexibility and an excellent ability to be impregnated with a cosmetic, enables the cosmetic to be applied evenly onto the skin, and is unlikely to deform and wear out even when it is impregnated with the cosmetic. If the average diameter of the air bubble cross sections is too large, such a foam does not enable a cosmetic to be applied evenly onto the skin, and wears out when it is impregnated with the cosmetic. If the average diameter of the air bubble cross sections is too small, such a foam may have poor flexibility and a poor ability to be impregnated with a cosmetic.

The average diameter of the air bubble cross sections is the average of the diameters of air bubble cross sections observed in an arbitrary cross section of the foam. The average diameter of air bubble cross sections is determined as follows: An arbitrary cross section of the foam is observed at a magnification of 100× using an optical microscope (digital microscope VEX-900F, available from Keyence Corp.). Air bubble cross sections with a diameter of 50 μm or more are selected from air bubble cross sections observed in an arbitrary 1 mm×1 mm region, and the cross-sectional shapes thereof are approximated to circles, which are then measured for diameter. The same measurement process is repeated for other 9 arbitrary sites. The average diameter of the air bubble cross sections is calculated from the measured diameters of the air bubble cross sections included in the total 10 regions. It should be noted that the arbitrary 1 mm×1 mm region is selected not to include any air bubble cross section with a diameter of 0.6 mm or more.

The number of air bubble cross sections with a diameter of 0.6 mm or more present in the cross section of the foam according to the present invention is 0.062 per mm$^2$ or less, preferably 0.049 per mm$^2$ or less, more preferably 0.037 per rare or less. Control of the number of such large-diameter air bubble cross sections within the above ranges results in a foam which has excellent flexibility and an excellent ability to be impregnated with a cosmetic, enables the cosmetic to be applied evenly onto the skin, and is unlikely to deform and wear out even when it is impregnated with the cosmetic. A foam having too many large-diameter air bubble cross sections does not enable a cosmetic to be applied evenly onto the skin. The lower limit is not particularly limited, and a smaller number of large-diameter air bubbles is better. Although the lower limit is preferably 0 per mm$^2$ or more, the presence of 0.001 or more air bubbles per mm$^2$ or 0.012 or more air bubbles per mm$^2$ usually causes no practical problem.

The diameters of the air bubble cross sections are the diameters of air bubble cross sections observed in an arbitrary cross section of the foam. The number of air bubble cross sections with a diameter of 0.6 mm or more is determined as follows: An arbitrary cross section of the foam is observed at a magnification of 30× using an optical microscope (digital microscope VEX-900F, available from Keyence Corp.). The cross-sectional shapes of air bubble cross sections observed in an arbitrary 9 mm×9 mm region are approximated to circles. The circles are measured for diameter, and air bubble cross sections with a diameter of 0.6 mm or more are counted. In the case where an air bubble cross section with a diameter of 0.6 mm or more is located on the boundary of the observation region, the proportion of the area within the observation region relative to the whole area of the air bubble cross section is determined, and the product of 1 multiplied by the proportion is regarded as its number. For example, in the case where one air bubble cross section with a diameter of 0.6 mm or more is located on the boundary and 30% thereof is located within the observation region, it is counted as 0.3.

Ultraviolet Absorber

The foam according to the present invention preferably further contains an ultraviolet absorber. When the ultraviolet absorber is present, the foam is more unlikely to deform and wear out even when it is impregnated a cosmetic, in particular a cosmetic containing an ultraviolet absorber.

The ultraviolet absorber is present in the foam according to the present invention in an amount of preferably 1 to 10 parts by weight, more preferably 3 to 7 parts by weight relative to 100 parts by weight of the sum of the nitrile group-containing conjugated diene copolymer and the urethane polymer. Control of the amount of ultraviolet absorber within the above ranges results in a foam which is more unlikely to deform and wear out even when it is impregnated with a cosmetic.

Examples of the ultraviolet absorber include, but are not limited to, cinnamate-based ultraviolet absorbers such as octyl p-methoxycinnamate (ethylhexyl methoxycinnamate), isopropyl p-methoxycinnamate, and glyceryl mono-2-ethyl-hexanoate di-p-methoxycinnamate; benzoic acid-based ultraviolet absorbers such as p-aminobenzoic acid; anthranilate-based ultraviolet absorbers such as methyl anthranilate; salicylate-based ultraviolet absorbers such as octyl salicylate and phenyl salicylate; ultraviolet absorbers such as urocanic acid and ethyl urocanate; benzophenone-based ultraviolet absorbers such as 2-hydroxy-4-methoxybenzophenone and dihydroxybenzophenone; benzotriazole-based ultraviolet absorbers; 2-phenylbenzimidazole-5-sulfonic acid; and the like.

Method for Producing Foam

The foam according to the present invention can be produced by foaming a polymer latex containing the nitrile group-containing diene copolymer and the urethane polymer at a predetermined expansion ratio, and solidifying the latex.

The polymer latex can be prepared by blending a latex of the nitrile group-containing diene copolymer with a latex of the urethane polymer, for example.

Examples of methods for controlling the density of the foam according to the present invention and the size of air bubbles include, but are not limited to, a method of adjusting the amount of antifoaming agent in the polymer latex; a method of adjusting the amount of foam stabilizer in the polymer latex; a method of controlling the expansion ratio; a method of adjusting the amount of foam stabilizer present during production of the foam; a method of selecting the type and the amount of coagulant; and the like.

Examples of the antifoaming agent include, but are not limited to, fat and oil antifoaming agents, mineral oil antifoaming agents such as modified hydrocarbon oils containing mineral oils as a base, silicone antifoaming agents such as silicone oils, polymer antifoaming agents, and the like. Among these antifoaming agents, preferred are mineral oil antifoaming agents and silicone antifoaming agents. These antifoaming agents may be used alone or in combination.

The amount of antifoaming agent in the polymer latex is preferably 0.001 to 1.0 part by weight, more preferably 0.005 to 0.8 parts by weight, further more preferably 0.005 to 0.6 parts by weight relative to 100 parts by weight of polymers in the polymer latex. The antifoaming agent may be an antifoaming agent contained in the nitrile group-containing diene copolymer latex used to prepare the polymer latex. By controlling the amount of antifoaming agent in the polymer latex within the above ranges, the density of the foam and the size of air bubbles can be controlled within the appropriate ranges.

Examples of the foam stabilizer include, but are not limited to, reaction products resulting from the reaction of alkyl chlorides (e.g., ethyl chloride) with formaldehyde and ammonia, such as the reaction product of ethyl chloride, formaldehyde, and ammonia; alkyl quaternary ammonium chlorides; alky aryl sulfonic acid salts; ammonium salts of higher fatty acids; and the like. Among these, preferred is the reaction product of ethyl chloride, formaldehyde, and ammonia. These foam stabilizers may be used alone or in combination.

The amount of foam stabilizer in the polymer latex is preferably 0.5 to 5 parts by weight, more preferably 1 to 5 parts by weight relative to 100 parts by weight of polymers in the polymer latex. By controlling the amount of foam stabilizer in the polymer latex within the above ranges, the density of the foam and the size of air bubbles can be controlled within the appropriate ranges.

The expansion ratio during foaming of the polymer latex is preferably 3 to 7 times, more preferably 4 to 6 times. By controlling the expansion ratio within the above ranges, the density of the foam and the size of air bubbles can be controlled within the appropriate ranges.

The nitrile group-containing conjugated diene copolymer latex may be prepared by a method involving copolymerizing the constituent monomers of the polymer in the latex by emulsion polymerization, subjecting the resulting emulsion to a particle size increasing treatment, and concentrating the emulsion; and the like.

The particle size increasing treatment is a treatment in which after the polymerization reaction is terminated, polymer particles in the resulting emulsion are joined to form larger particles. Through the particle size increasing treatment, the resulting nitrile group-containing conjugated diene copolymer latex can be controlled to have a desired particle size distribution, facilitating control of the density of the foam and the size of air bubbles.

Examples of the particle size increasing treatment include, but are not limited to, (1) a treatment involving adding a conjugated diene compound such as 1,3-butadiene and a solvent such as toluene to the emulsion after the termination of the polymerization, and intensively stirring the emulsion; (2) a treatment involving adding a particle size increasing agent such as a carboxyl group-containing polymer latex to the emulsion, and intensively stirring the emulsion; and the like.

In the case where the treatment (1) is performed as the particle size increasing treatment, the solvent is preferably added in an amount of 30 to 300 parts by weight relative to 100 parts by weight of polymers in the emulsion. In addition, in the case where the treatment (1) is performed as the particle size increasing treatment, the stirring conditions are not particularly limited. For example, a stirrer such as a paddle blade stirrer is used preferably at a rotational speed of 50 to 2500 rpm, and the stirring time is preferably 0.5 to 12.0 hours.

In order to prevent foaming caused by stirring, it is preferred that an antifoaming agent be added to the emulsion to perform the particle size increasing treatment in the presence of the antifoaming agent.

After the nitrile group-containing conjugated diene copolymer latex is prepared through the particle size increasing treatment, the nitrile group-containing conjugated diene copolymer latex is preferably subjected to a concentration treatment to control the solids content of the nitrile group-containing conjugated diene copolymer latex. Examples of the concentration treatment include, but are not limited to, reduced pressure distillation, normal pressure distillation, centrifugation, membrane concentration, and the like. Among these, preferred is reduced pressure distillation.

In the case where the nitrile group-containing conjugated diene copolymer is concentrated by reduced pressure distillation, the conditions for the concentration treatment are as follows: The pressure is preferably 100 to 0 kPa, more preferably 95 to 1.0 kPa. The temperature is preferably 30 to 100° C., more preferably 40 to 95° C.

In order to prevent foaming also during concentration, it is preferred that an antifoaming agent be added to the latex and the concentration be performed in the presence of the antifoaming agent.

The antifoaming agent may be added during only any one of the particle size increasing treatment and the concentration treatment, or the same antifoaming agent or different antifoaming agents may be added during the two treatments. It is preferred that the antifoaming agent be added at least when the particle size increasing treatment is performed. In this case, the antifoaming agent can prevent foaming not only during the particle size increasing treatment but also during the concentration treatment following the particle size increasing treatment.

The total amount of antifoaming agent to be added during the particle size increasing treatment and the concentration treatment is preferably 0.001 to 1.0 part by weight, more preferably 0.005 to 0.8 parts by weight, further more preferably 0.005 to 0.6 parts by weight by weight relative to 100 parts by weight of polymer in the resulting nitrile group-containing conjugated diene polymer latex. If the antifoaming agent is added in an amount of less than 0.001 parts by weight, vigorous foaming may occur during the particle size increasing treatment. As a result, particles may not be appropriately agglomerated and thus a desired particle size distribution may not be provided. Such vigorous foaming may also be caused when the concentration treatment is performed, resulting in a reduction in productivity of the polymer latex. In contrast, if the antifoaming agent is added in an amount of more than 1.0 part by weight, the final polymer latex may contain an excessive amount of antifoaming agent, resulting in a foam having a poor appearance and having an excessively low Young's modulus and thus poor resilience.

The antifoaming agent may be added during only any one of the particle size increasing treatment and the concentration treatment, or the same antifoaming agent or different antifoaming agents may be added during the two treatments. It is preferred that the antifoaming agent be added at least when the particle size increasing treatment is performed. In this case, the antifoaming agent can prevent foaming not only during the particle size increasing treatment but also during the concentration treatment following the particle size increasing treatment.

It is preferred that the polymer latex used in the present invention be compounded with compounding agents such as a cross-linking agent. In other words, it is preferred that the polymer latex used in the present invention be used in the form of a polymer latex composition.

Examples of the cross-linking agent include sulfurs such as powdery sulfur, flowers of sulfur, precipitated sulfur, colloidal sulfur, surface-treated sulfur, and insoluble sulfur; and sulfur-containing compounds such as sulfur chloride, sulfur dichloride, morpholine disulfide, alkylphenol disulfides, N,N'-dithio-bis(hexahydro-2H-azepin-2-one), phosphorus-containing polysulfides, polymer polysulfides, and 2-(4'-morpholinodithio)benzothiazole. Among these cross-linking agents, sulfur can be preferably used. These cross-linking agents can be used alone or in combination.

Although the content of the cross-linking agent is not particularly limited, the content is preferably 0.1 to 10 parts by weight, more preferably 0.2 to 3 parts by weight relative to 100 parts by weight of polymers in the polymer latex. A content of the cross-linking agent controlled within the above ranges results in a foam having further enhanced strength.

It is preferred that the polymer latex used in the present invention further contain a cross-linking accelerator.

The cross-linking accelerator can be those usually used in the manufacturing of foams. Examples thereof include dithiocarbamic acids such as diethyldithiocarbamic acid, dibutyldithiocarbamic acid, di-2-ethylhexyldithiocarbamic acid, dicyclohexyldithiocarbamic acid, diphenyldithiocarbamic acid, and dibenzyldithiocarbamic acid and zinc salts thereof; 2-mercaptobenzothiazole, zinc 2-mercaptobenzothiazole, 2-mercaptothiazoline, dibenzothiazyl disulfide, 2-(2,4-dinitrophenylthio)benzothiazole, 2-(N,N-diethylthiocarbamoylthio)benzothiazole, 2-(2,6-dimethyl-4-morpholinothio)benzothiazole, 2-(4'-morpholinodithio)benzothiazole, 4-morpholinyl-2-benzothiazyl disulfide, 1,3-bis(2-benzothiazyl mercaptomethyl)urea, and the like. Preferred are zinc diethyldithiocarbamate, zinc dibutyldithiocarbamate, and zinc 2-mercaptobenzothiazole. These cross-linking accelerators can be used alone or in combination.

The content of the cross-linking accelerator is preferably 0.1 to 5 parts by weight, more preferably 0.2 to 4 parts by weight relative to 100 parts by weight of polymers in the polymer latex. A content of the cross-linking accelerator controlled within the above ranges results in a foam having further enhanced strength.

Furthermore, it is preferred that the polymer latex used in the present invention contain zinc oxide.

Although the content of zinc oxide is not particularly limited, the content is preferably 0.5 to 10 parts by weight, more preferably 0.5 to 8 parts by weight relative to 100 parts by weight of polymers in the polymer latex. A content of zinc oxide controlled within the above ranges can provide high emulsion stability, and can further enhance the strength of the resulting foam.

Furthermore, a dispersant (such as NASF (the sodium salt of the naphthalene sulfonic acid-formaldehyde condensate)) for stably dispersing agents such as an antioxidant and a colorant and the variety of compounding agents listed above, a thickener (such as polyacrylic acid and sodium salts thereof, sodium alginate, or poly(vinyl alcohol)), a surfactant as a foaming agent (such as an aliphatic alkali soap such as potassium oleate, or a sulfate of higher alcohols such as sodium dodecylsulfate) can be compounded with the polymer latex used in the present invention as needed.

Examples of methods for mixing such a variety of compounding agents with the polymer latex include, but are not limited to, a method of preparing the polymer latex as described above, and mixing a variety of compounding agents, which are compounded as needed, with the polymer latex using a dispersing machine such as a ball mill, a kneader, a disper, or the like; a method of preparing an aqueous dispersion of compounding components other than the polymer latex using the dispersing machine, and mixing the aqueous dispersion with the polymer latex; and the like.

Although air is usually used in foaming, a carbonate such as ammonium carbonate or sodium bicarbonate; an azo compound such as azodicarboxylic amide or azobisisobutyronitrile; a gas generating substance such as benzenesulfonyl hydrazide; or the like can also be used. If air is used, the polymer latex can be foamed by stirring the polymer latex to take the air thereinto. In this case, an Oakes foaming machine, an ultrasonic foaming machine, or the like can be used, for example.

After the polymer latex is foamed, the foamed polymer latex is solidified to fix the foamed state. Any solidifying method which enables gelation and solidification of the latex can be used, and traditionally known methods can be used. Examples thereof include the Dunlop method (solidification at normal ambient temperature) of adding a normal-temperature solidifying agent, e.g., a silicon fluoride compound such as sodium hexafluorosilicate (sodium silicofluoride), potassium hexafluorosilicate (potassium silicofluoride), sodium titanium silicofluoride, or the like to the polymer latex; a heat-sensitive solidification method of adding a heat-sensitive solidifying agent such as organopolysiloxane, poly(vinyl methyl ether), or a zinc ammonium sulfate complex to the foamed polymer latex; a freeze-drying solidification method; and the like. The solidifying agent such as the normal-temperature solidifying agent or the heat-sensitive solidifying agent is present in an amount of preferably 0.5 to 10 parts by weight, more preferably 0.5 to 8 parts by weight relative to 100 parts by weight of polymers in the polymer latex, although not particularly limited thereto.

The foamed polymer latex can be famed into a foam by adding the solidifying agent to the foamed polymer latex, placing the latex into a mold having a desired shape, and solidifying the latex. If the cross-linking agent is present in the polymer latex, it is preferred that the polymer latex be solidified, and then be heated to induce cross-linking. As the cross-linking condition, the heat treatment can be performed at a temperature of preferably 100 to 160° C. for a time of preferably 15 to 60 minutes.

It is preferred that the resulting foam be removed from the mold, and be washed. Examples of washing methods include, but are not limited to, a method of washing the foam with water at about 20 to 70° C. using a washing machine or the like by stirring for about 5 to 15 minutes. It is preferred that after the washing, water be drained, and the foam be dried at a temperature of about 30 to 90° C. without impairing the feel of the foam. The foam thus produced can be used as puffs (cosmetic sponges) and the like by slicing and cutting into a predetermined thickness and a predetermined shape, and polishing the lateral surfaces of the products with a rotary grinding wheel.

The foam according to the present invention, because of its excellent flexibility, can be suitably used in a variety of applications such as mattresses, puffs (cosmetic sponges), rolls, and shock absorbers. In particular, the foam according to the present invention can be suitably used as a puff (cosmetic sponge) intended to be impregnated with a liquid cosmetic or the like because the foam has excellent flexibility and an excellent ability to be impregnated with a cosmetic, enables the cosmetic to be applied evenly onto the skin, and is unlikely to deform and wear out even when it is impregnated with the cosmetic.

EXAMPLES

The present invention is hereinafter illustrated in specific detail with reference to Examples and Comparative Examples. In the following examples, all "parts" are on a weight basis unless otherwise indicated. Tests and evaluations were performed according to the following methods.

Content of Acrylonitrile Units

The content of acrylonitrile units was determined by measuring the nitrogen content of a nitrile group-containing conjugated diene copolymer by the Kjeldahl method according to JIS K 6384.

Tetrahydrofuran (THF) Insoluble Fraction 1 g of a urethane polymer latex was added to 50 g of THF (solvent), and was dissolved therein by shaking for 24 hours at 25° C. Using a centrifuge, the supernatant was removed from the resulting solution. The solvent was evaporated, and the remaining residue was dried and weighed. The THF insoluble fraction was calculated based on the measured weight of the residue and the weight of the urethane polymer contained in the latex.

Viscosity at Solids Content of 50 wt %

A urethane polymer latex was adjusted to have a solids content of 50 wt %. The resulting latex was measured for viscosity at 25° C. using a viscometer (BII-type viscometer (product name: BLII), available from TOKI SANGYO CO., LTD.).

Density

A foam was weighed, and the density was calculated by dividing the weight by the volume.

Number of Air Bubble Cross Sections with Diameter of 0.6 mm or More

An arbitrary cross section of a foam was observed at a magnification of 30× using an optical microscope (digital microscope VEX-900F, available from Keyence Corp.). The cross-sectional shapes of air bubble cross sections observed in an arbitrary 9 mm×9 mm region were approximated to circles. The circles were measured for diameter, and air bubble cross sections with a diameter of 0.6 mm or more were counted.

FIG. 1 shows one exemplary microscopic photograph (magnification=30×) of an arbitrary cross section of a foam. In the microscopic photograph shown in FIG. 1, five air bubble cross sections 12 having a diameter of 0.6 mm or more can be seen in an arbitrary 9 mm×9 mm region 11.

Average Diameter of Air Bubble Cross Sections

An arbitrary cross section of a foam was observed at a magnification of 100× using an optical microscope (digital microscope VEX-900F, available from Keyence Corp.). Air bubble cross sections with a diameter of 50 µm or more were selected from air bubble cross sections observed in an arbitrary 1 mm×1 mm region, and the cross-sectional shapes thereof were approximated to circles, which were then measured for diameter. The same measurement process was repeated for other 9 arbitrary sites. The average diameter of the air bubble cross sections was calculated from the measured diameters of the air bubble cross sections included in the total 10 regions.

Figure 2A:
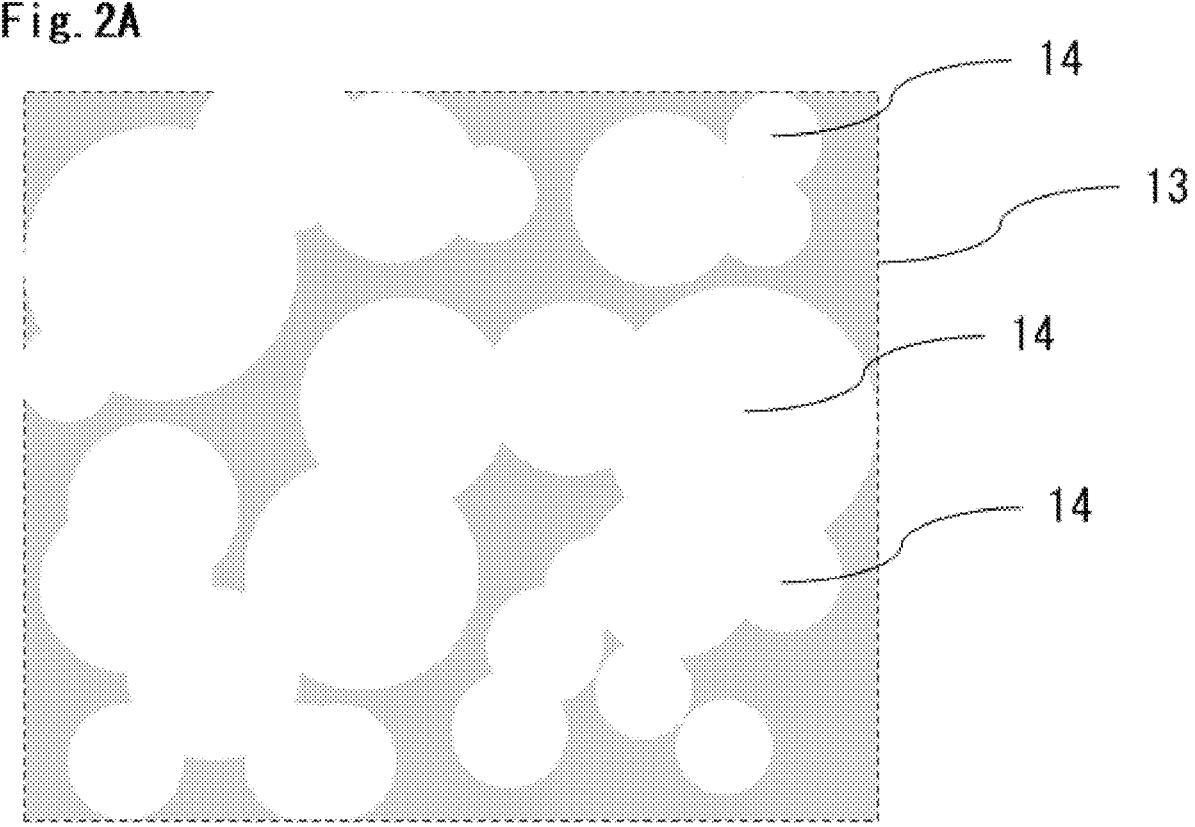
FIG. 2A is a schematic view created based on a microscopic photograph taken during observation of a region 13 (1 mm×1 mm) in the microscopic photograph in FIG. 1 at a magnification of 100×. In the view, the shapes of air bubble cross sections with a diameter of 50 µm or more are approximated to circles.

FIG. 2A is a schematic view created based on a microscopic photograph taken during observation of the region 13 (1 mm×1 mm) in the microscopic photograph in FIG. 1 at a magnification of 100×. In the view, the shapes of air bubble cross sections with a diameter of 50 µm or more are approximated to circles. In the schematic view shown in FIG. 2A, a plurality of air bubble cross sections 14 with a diameter of 50 µm or more and less than 0.6 mm can be observed.

When the average diameter of air bubble cross sections is determined, a region to be observed with the optical microscope is selected not to include any air bubble cross section with a diameter of 0.6 mm or more. As shown in FIG. 2A, the air bubble cross sections with a diameter of 50 µm or more are selected from air bubble cross sections in the selected region, and the cross-sectional shapes thereof are approximated to circles, which are then measured for diameter. This process is performed for 10 separate regions in total, and the average of the diameters of all the air bubble cross sections selected is determined.

Figure 2B:
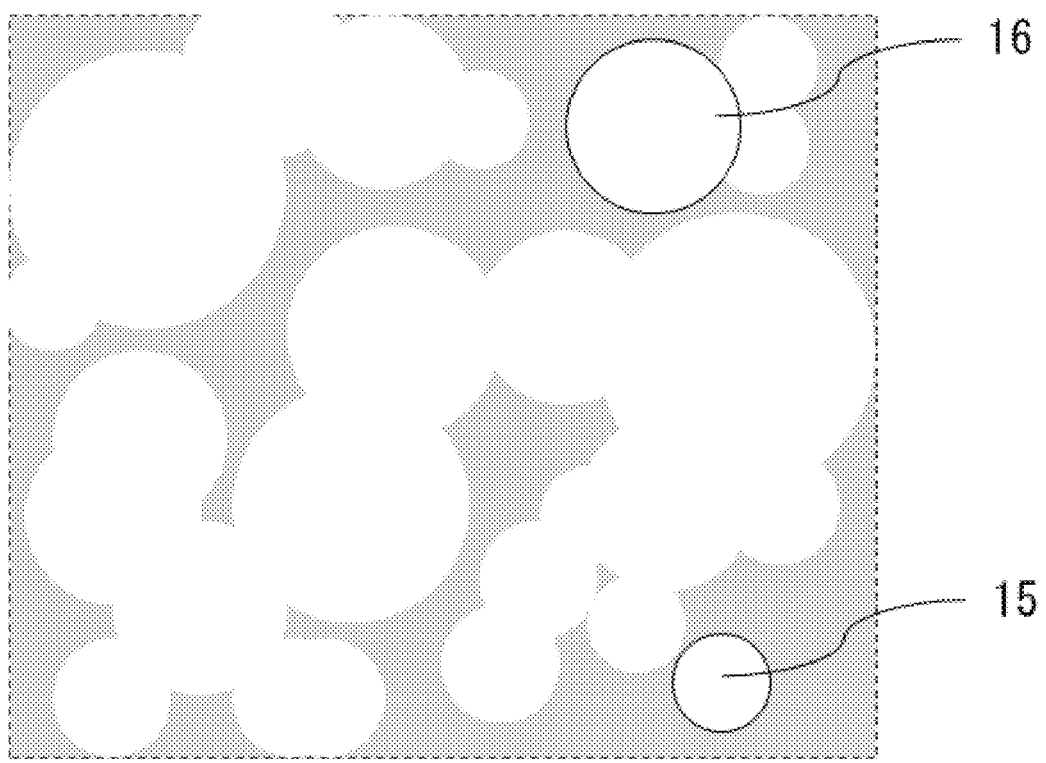
FIG. 2B is a schematic view illustrating a cross section of an independent air bubble and a cross section of a continuous air bubble among the air bubble cross sections in FIG. 2A.

As shown in FIG. 2B, the cross section of the foam includes cross sections 15 of mutually independent air bubbles and cross sections 16 of continuous air bubbles which are composed of two or more combined air bubbles. Even for the cross sections of continuous air bubbles, assuming that the cross sections are cross sections of independent air bubbles, the cross-sectional shapes thereof are approximated to circles and the circles are measured for diameter.

Undeformability of Foam Impregnated with Liquid Cosmetic

A foam was immersed in a liquid cosmetic (ANESSA (registered trademark), Perfect UV Aqua Booster, available from SHISEIDO Co., Ltd.) at 23° C. for 3 days. The proportion of the volume of the foam after immersion to the volume of the foam before immersion (swelling ratio (%)=(volume of foam after immersion)/(volume of foam before immersion)×100) was calculated and evaluated based on the following criteria.

+: The swelling ratio was 115% or less.
−: The swelling ratio was more than 115%.

Wear of Foam Impregnated with Liquid Cosmetic

A foam was immersed in a liquid cosmetic (ANESSA (registered trademark), Perfect UV Aqua Booster, available from SHISEIDO Co., Ltd.). The foam was measured for abrasion loss using a Martindale abrasion machine (STM 633, available from SATRA) after 1000 rotations of a polishing wheel at a test temperature of 23° C. and a load of 9 kPa, and the abrasion loss was evaluated based on the following criteria.

+: The abrasion loss was 30% or less.
−: The abrasion loss was more than 30%.

Ability to be Impregnated with Liquid Cosmetic

A foam was evaluated for ability to be impregnated with a liquid cosmetic (ANESSA (registered trademark), Perfect UV Aqua Booster, available from SHISEIDO Co., Ltd.) based on the following criteria.

+: The foam was easily impregnated with the liquid cosmetic.
−: The foam was not easily impregnated with the liquid cosmetic.

Flexibility of Foam

A foam was touched with fingers to evaluate flexibility based on the following criteria.

+: The foam was soft.
−: The foam was hard.

Unevenness of Cosmetic Applied

A liquid cosmetic (ANESSA (registered trademark), Perfect UV Aqua Booster, available from SHISEIDO Co., Ltd.) was deposited on a foam and was applied to the skin using the foam. The unevenness of the cosmetic applied was evaluated based on the following criteria.

+: The liquid cosmetic was evenly applied.
−: The liquid cosmetic applied was uneven.

Example 1

A latex mixture was prepared by mixing a nitrile group-containing conjugated diene copolymer latex (product name: "LX531B", available from Zeon Corp., solids content: 65 wt %, acrylonitrile unit content: 35 wt %) and a urethane polymer latex (SUPERFLEX (registered trademark) E-2000, available from DKS Co. Ltd., solids content: 50 wt %, THF insoluble fraction: 6.5 wt %, viscosity at a solids content of 50 wt %: 4100 Pa·s) in amounts which gave a weight ratio of the solid components "nitrile group-containing conjugated diene copolymer/urethane polymer" of 85/15.

4 parts of a vulcanization system aqueous dispersion (colloidal sulfur/dithiocarbamate vulcanization accelerator NOCCELER EZ (available from Ouchi Shinko Chemical Industrial Co., Ltd.)/thiazole vulcanization accelerator NOCCELER MZ (available from Ouchi Shinko Chemical Industrial Co., Ltd.)=2/1/1 (weight ratio), solids content: 50%), 3 parts of an aqueous dispersion of zinc oxide (solids content: 50%), and 1 part of a foam stabilizer (TRIMENE BASE: available from Crompton Corp.) were added relative to 100 parts of polymers in the latex mixture prepared above, and were sufficiently dispersed to prepare a polymer latex composition.

The polymer latex composition was stirred using a stand mixer (model "ESM945", available from Electrolux AB) to foam the polymer latex composition into an about 5-fold volume. 1.5 parts of an aqueous dispersion of sodium silicofluoride (solids content: 20%) was added, and the mixture was further stirred for 1 minute to yield a foamed product.

The foamed product was then poured into a shaping mold (diameter: 7 cm, height: 8 cm), was solidified, and was vulcanized by heating at 110° C. for one hour. Subsequently, after removed from the mold, the resulting product was washed with water at 40° C. for 10 minutes, and was further dried in an oven at 60° C. for 4 hours. The product was cut into a thickness of 0.8 cm in the height direction to obtain a disk-shaped foam. The foam was determined for density, average diameter of air bubble cross sections, and the number of air bubble cross sections with a diameter of 0.6 mm or more according to the methods described above. The undeformability of the foam impregnated with the liquid cosmetic, the ability to be impregnated with the liquid cosmetic, the flexibility of the foam, and the unevenness of the cosmetic applied were also evaluated. The results are shown in Table 1.

Example 2

A foam was prepared in the same manner as in Example 1 except that the weight ratio of the solid components "nitrile group-containing conjugated diene copolymer/urethane polymer" was changed to 80/20. The foam was evaluated in the same manner as above. The results are shown in Table 1.

Example 3

A foam was prepared in the same manner as in Example 1 except that the weight ratio of the solid components "nitrile group-containing conjugated diene copolymer/urethane polymer" was changed to 70/30. The foam was evaluated in the same manner as above. The results are shown in Table 1.

Example 4

A foam was prepared in the same manner as in Example 1 except that 5 parts of octyl p-methoxycinnamate as an ultraviolet absorber was added relative to 100 parts of the sum of the nitrile group-containing conjugated diene copolymer and the urethane polymer. The foam was evaluated in the same manner as above. The results are shown in Table 1.

Comparative Example 1

A foam was prepared in the same manner as in Example 1 except that the latex used was only the nitrile group-containing conjugated diene copolymer latex, and the urethane polymer latex was not used. The foam was evaluated in the same manner as above. The results are shown in Table 1.

Comparative Example 2

A foam was prepared in the same manner as in Comparative Example 1 except that a nitrile group-containing conjugated diene copolymer latex ("Latex C2" in Table 1) (solids content: 65 wt %, acrylonitrile unit content: 38 wt %) was used. The foam was evaluated in the same manner as above. The results are shown in Table 1.

Comparative Example 3

A latex mixture was prepared by mixing a nitrile group-containing conjugated diene copolymer (product name: "LX531B", available from Zeon Corp., solids content: 65 wt %, acrylonitrile unit content: 35 wt %), a nitrile group-containing conjugated diene copolymer (product name: "LX531", available from Zeon Corp., solids content: 65 wt %, acrylonitrile unit content: 25 wt %), and a urethane polymer latex (SUPERFLEX (registered trademark) E-2000, available from DKS Co. Ltd., solids content: 50 wt %, THF insoluble fraction: 6.5 wt %, viscosity at a solids content of 50 wt %: 4100 Pa·s) in amounts which gave a weight ratio of the solid components "nitrile group-containing conjugated diene copolymer (LX531B)/nitrile group-containing conjugated diene copolymer (LX531)/urethane polymer" of 50/40/10.

A foam was prepared in the same manner as in Example 1 except that the latex mixture prepared above was used. The foam was evaluated in the same manner as above. The results are shown in Table 1.

Comparative Example 4

A foam was prepared in the same manner as in Comparative Example 3 except that the weight ratio of the solid components "nitrile group-containing conjugated diene copolymer (LX531B)/nitrile group-containing conjugated diene copolymer (LX531)/urethane polymer" was changed to 50/30/20. The foam was evaluated in the same manner as above. The results are shown in Table 1.

Comparative Example 5

A foam was prepared in the same manner as in Example 1 except that the polymer latex composition was foamed into an about 8-fold volume. The foam was evaluated in the same manner as above. The results are shown in Table 1.

Comparative Example 6

A foam was prepared in the same manner as in Example 1 except that the polymer latex composition was foamed into an about 2-fold volume. The foam was evaluated in the same manner as above. The results are shown in Table 1.

Comparative Example 7

A foam was prepared in the same manner as in Example 1 except that the amount of foam stabilizer added was changed to 0.3 parts. The foam was evaluated in the same manner as above. The results are shown in Table 1.

Comparative Example 8

A foam was prepared in the same manner as in Example 1 except that 0.1 parts of the antifoaming agent was added. The foam was evaluated in the same manner as above. The results are shown in Table 1.

TABLE 1

| | | Example | | | | Comparative Example | |
|---|---|---|---|---|---|---|---|
| | | 1 | 2 | 3 | 4 | 1 | 2 |
| Features of foam | | | | | | | |
| Nitrile group-containing conjugated diene copolymer | | | | | | | |
| Name | | LX531B | LX531B | LX531B | LX531B | LX531B | Latex C2 |
| Acrylonitrile unit | (wt %) | 35 | 35 | 35 | 35 | 35 | 35 |
| Composition | | | | | | | |
| Nitrile group-containing conjugated diene copolymer | (parts) | 85 | 80 | 70 | 85 | 100 | 100 |
| Urethane polymer | (parts) | 15 | 20 | 30 | 15 | 0 | 0 |
| Ultraviolet absorber | (parts) | Not used | Not used | Not used | 5 | Not used | Not used |
| Density | (g/cm³) | 0.11 | 0.14 | 0.16 | 0.14 | 0.14 | 0.12 |
| Average diameter of air bubble cross sections | (μm) | 155 | 201 | 190 | 250 | 250 | 224 |
| Number of air bubble cross sections with diameter of 0.6 mm or more per 1 mm² | | 0.025 | 0.012 | 0.012 | 0.037 | 0.025 | 0.025 |
| Evaluations | | | | | | | |
| Undeformability of foam impregnated with liquid cosmetic | | + | + | + | + | − | + |
| Wear of foam impregnated with liquid cosmetic | | + | + | + | + | − | − |
| Ability to be impregnated with liquid cosmetic | | + | + | + | + | + | + |
| Flexibility of foam | | + | + | + | + | + | + |
| Unevenness of cosmetic applied | | + | + | + | + | + | + |

| | | Comparative Example | | | | | |
|---|---|---|---|---|---|---|---|
| | | 3 | 4 | 5 | 6 | 7 | 8 |
| Features of foam | | | | | | | |
| Nitrile group-containing conjugated diene copolymer | | | | | | | |
| Name | | LX531B + LX531 | LX531B + LX531 | LX531B | LX531B | LX531B | LX531B |
| Acrylonitrile unit | (wt %) | 31 | 31 | 35 | 35 | 35 | 35 |
| Composition | | | | | | | |
| Nitrile group-containing conjugated diene copolymer | (parts) | 50 + 40 | 50 + 30 | 85 | 85 | 85 | 85 |
| Urethane polymer | (parts) | 10 | 20 | 15 | 15 | 15 | 15 |
| Ultraviolet absorber | (parts) | Not used | Not used | Not used | Not used | Not used | Not used |
| Density | (g/cm³) | 0.14 | 0.15 | 0.06 | 0.41 | 0.11 | 0.14 |
| Average diameter of air bubble cross sections | (μm) | 280 | 150 | 267 | 180 | 380 | 250 |
| Number of air bubble cross sections with diameter of 0.6 mm or more per 1 mm² | | 0.012 | 0.037 | 0.049 | 0 | 0.049 | 0.086 |
| Evaluations | | | | | | | |
| Undeformability of foam impregnated with liquid cosmetic | | − | − | + | + | + | + |
| Wear of foam impregnated with liquid cosmetic | | − | − | − | + | − | + |
| Ability to be impregnated with liquid cosmetic | | + | + | + | − | + | + |
| Flexibility of foam | | + | + | + | − | + | + |
| Unevenness of cosmetic applied | | + | + | + | + | − | − |

As seen in Table 1, in the examples where the amount of nitrile group-containing conjugated diene copolymer was less than 90 wt %, the amount of urethane polymer was more than 10 wt %, a copolymer containing an ethylenically unsaturated nitrile monomer units in an amount of more than 31 wt % was contained as the nitrile group-containing conjugated diene copolymer, the density was 0.08 to 0.30 g/cm³, the average diameter of air bubble cross sections was 350 μm or less, and the number of air bubble cross sections with a diameter of 0.6 mm or more was 0.062 per mm² or less, the foams had excellent flexibility and an excellent ability to be impregnated with the cosmetic, enabled the cosmetic to be applied evenly onto the skin, and were unlikely to deform and wear out (Examples 1 to 4) even when they were impregnated with the cosmetic.

In contrast, the foams free from the urethane polymer defamed and significantly wore out when it was impregnated with the cosmetic (Comparative Examples 1 and 2).

The foams in which the nitrile group-containing conjugated diene copolymer containing ethylenically unsaturated nitrile monomer units in an amount of 31 wt % or less was contained as the nitrile group-containing conjugated diene copolymer also defamed and significantly wore out when they were impregnated with the cosmetic (Comparative Examples 3 and 4).

Additionally, the foam having a density of less than 0.08 g/cm³ wore out when it was impregnated with the cosmetic (Comparative Example 5), and the foam having a density of more than 0.30 g/cm³ had poor flexibility and a poor ability to be impregnated with the cosmetic (Comparative Example 6).

Moreover, the foam in which the average diameter of air bubble cross sections was more than 350 μm did not enable the cosmetic to be applied evenly onto the skin, and wore out when it was impregnated with the cosmetic (Comparative Example 7). Also, the foam in which the number of air bubble cross sections with a diameter of 0.6 mm or more was more than 0.062 per mm² did not enable the cosmetic to be applied evenly onto the skin (Comparative Example 8).

REFERENCE SIGNS LIST

11 Arbitrary 9 mm×9 mm region
12, 14 Air bubble cross section
13 Arbitrary 1 mm×1 mm region
15 Cross section of independent air bubble
16 Cross section of continuous air bubble

The invention claimed is:

1. A foam comprising a nitrile group-containing conjugated diene copolymer component and a urethane polymer component,
wherein relative to 100 wt % of the sum of the nitrile group-containing conjugated diene copolymer component and the urethane polymer component, the nitrile group-containing conjugated diene copolymer component is present in an amount of less than 90 wt % and the urethane polymer component is present in an amount of more than 10 wt %,
the nitrile group-containing conjugated diene copolymer component contains ethylenically unsaturated nitrile monomer units in an amount of 33 wt % or more,
the foam has a density of 0.08 to 0.30 g/cm³, and
in observation of an arbitrary cross section of the foam, air bubble cross sections present in the cross section have an average diameter of 350 μm or less, and the number of air bubble cross sections with a diameter of 0.6 mm or more present in the cross section is 0.062 per mm² or less.

2. The foam according to claim 1,
wherein the nitrile group-containing conjugated diene copolymer component is present in an amount of 85 wt % or less and the urethane polymer component is present in an amount of 15 wt % or more.

3. The foam according to claim 1,
wherein the nitrile group-containing conjugated diene copolymer component contains the ethylenically unsaturated nitrile monomer units in an amount of 33 to 80 wt % and conjugated diene monomer units in an amount of 20 to 67 wt %.

4. The foam according to claim 1, further comprising an ultraviolet absorber.

5. The foam according to claim 1, wherein the urethane polymer component does not contain a polybutadiene-based polyol as a polyaddition reaction component.

6. The foam according to claim 1, wherein the urethane polymer component comprises a polyether-based polyol as a polyaddition reaction component.

* * * * *